Patented Nov. 15, 1938

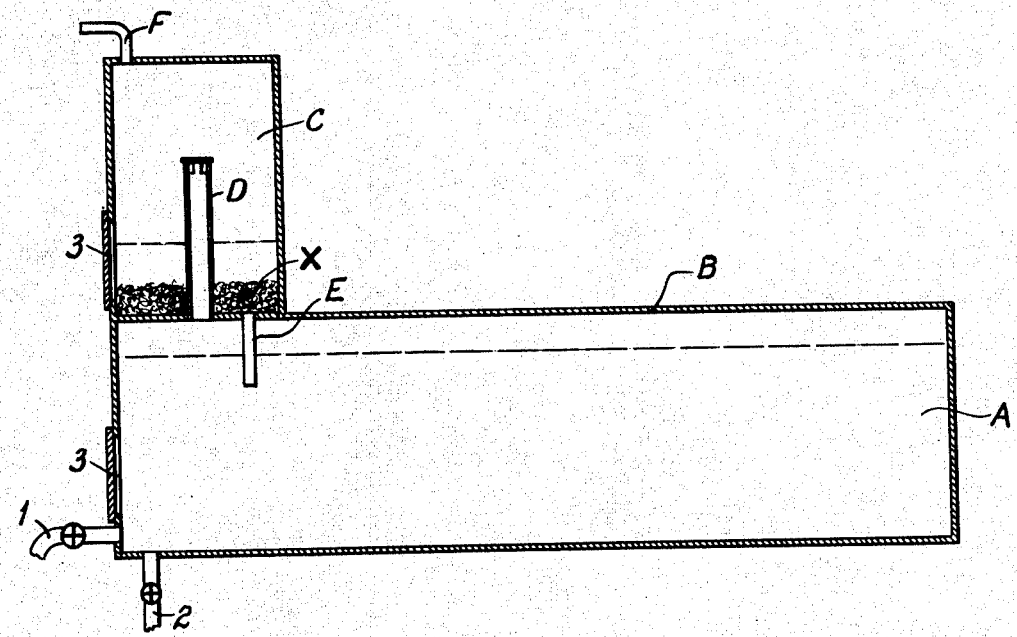
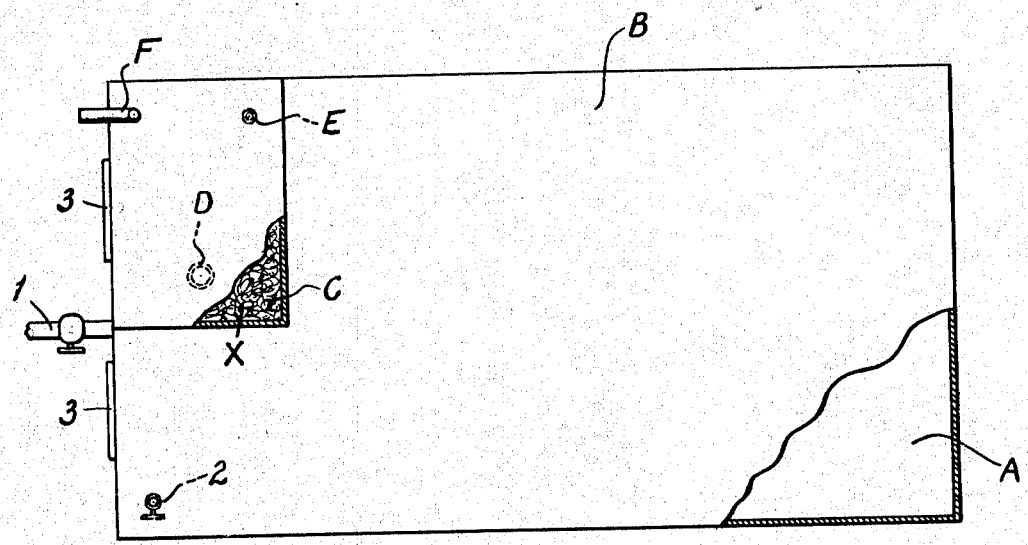

2,136,685

UNITED STATES PATENT OFFICE 2,136,685

METHOD FOR MANUFACTURING BEER

Rudolf Gull, Affton, Mo., assignor to Anheuser-Busch, Inc., St. Louis, Mo., a corporation of Missouri Application June 4, 1937, Serial No. 146,357

8 Claims. (Cl. 99—44)

This invention relates to the manufacture of beer.

It is well known in the beer brewing industry that during the main fermentation period a heavy foam is produced that contains an extremely bitter sediment. In fermenters of the open type it is the universal practice to manually skim off the foam several times during the fermentation for, unless this is done, the foam on top of the beer in the fermenter will collapse and the bitter sediment in the foam will mix again with the beer, thereby giving the beer a very harsh, bitter taste. With closed fermenters it is impossible to manually skim off the foam and, accordingly, beer produced in closed fermenters of conventional design is apt to have a disagreeable bitter taste.

The main object of my invention is to provide a method of making beer in a fermenter of the closed type, by which the major portion of the bitter sediment contained in the foam produced during fermentation, will be separated from the foam and retained in the fermenting chamber at a point or position where it cannot subsequently mix with or redissolve in the fermenting wort.

Briefly described, my method consists in causing foam produced in a closed container in which beer wort is being fermented to come in contact with a surface or surfaces in said chamber, disposed in such relationship with the beer wort that most of the bitter sediment in the foam will adhere to or cling to said surface or surfaces and be maintained at a point or position where it will not be dislodged from same or subsequently acted upon by the liquid wort or the evolved alcohol and thus become redissolved in or mixed with the wort undergoing fermentation. The apparatus in which said method is practiced consists of a fermenting chamber provided with a roof or ceiling whose underside constitutes a surface on which bitter sediment in the foam will be deposited, collected and maintained at a point or position where it will not be subsequently acted upon, mixed with or redissolved in the wort undergoing fermentation.

Fig. 1 of the drawing is a vertical sectional view of the closed fermenter that I prefer to use in carrying out my method.

Fig. 2 is a top plan view, partly broken away, of said fermenter.

In the drawing A designates the fermenting chamber of a beer fermenter of the closed type, and B designates a substantially flat or horizontally disposed collecting surface which constitutes ceiling or roof for said chamber arranged in such relationship with the level of the beer wort in said chamber that the carbonic acid gases produced during fermentation will carry the bitter sediment upwardly out of the wort and into the foam, and cause the foam to press against or come in contact with the underside of the roof or ceiling B. Being of a sticky nature the major portion of the bitter sediment will adhere to the underside of the ceiling B and remain thereon when the foam subsequently collapses, and in view of the fact that the surface to which said bitter sediment adheres is above the level of the liquid wort and out of contact with the same, there is no possibility of the fermenting wort or the alcohol evolved during fermentation, causing said bitter sediment to again mix with or redissolve in the fermenting wort.

In order that the fermenter will be economical and efficient in operation I prefer to provide it with a foam chamber C into which excess foam and carbonic acid gases escape from the fermenting chamber A through an outlet D in the flat ceiling that terminates inside of the foam chamber C, the amount or quantity of foam that enters the foam chamber C being only a small fractional part of the total amount of foam that is produced in the fermenting chamber A. In the foam chamber C the carbonic acid gases separate from the foam that has overflowed into said chamber C and escape from the foam chamber through a gas outlet F. When the foam in said foam chamber collapses any entrained beer in said foam will return to the fermenting chamber A through a return duct E which leads from the foam chamber back to the fermenting chamber. If desired a filtering means X of any suitable kind such as wood shavings, may be arranged at the bottom of the foam chamber C, so as to provide a contact surface of relatively great surface area to which the bitter sediment in the relatively small quantity of foam in the foam chamber will cling. In using the apparatus all that is necessary is that the fermenting chamber A be filled with beer wort to such a height or level that the volume of the space between the liquid wort and the ceiling of the fermenting chamber is less than the total amount of foam produced during fermentation, or in other words, is not great enough to receive all of the foam that is produced. Accordingly, during the main fermentation period the foam will press against or come in contact with the underside of the ceiling B of the fermenting chamber, while the liquid wort is maintained out of contact with the underside of said ceiling at approximately the level indicated by the horizontal dotted line in Figure 1. Owing to the fact that the gas bubbles carry the bitter sediment upwardly through the foam to the top side of same, said bitter sediment will be sure to become deposited on the underside of the ceiling of the fermenting chamber. The gases that escape from the fermenting chamber cause the excess foam, representing a small fraction of the total foam produced during fermentation, to be pushed out of the fermenting chamber into the foam chamber C through the outlet D. Inasmuch as said outlet D lies in the same horizontal plane as the flat underside of the ceiling B on which the bitter sediment was deposited, the gases have a natural tendency to escape from the fermenting chamber into the foam room, without disturbing said bitter sediment or flushing it off of said ceiling. At the completion of the fermentation operation the deposit of bitter sediment that has collected on the ceiling B of the fermenting chamber can be quickly and effectively removed therefrom in any suitable way. The fermenter is provided with a beer outlet I and a yeast outlet 2, and in order that the fermenter may be easily cleaned, the fermenting chamber A and foam chamber C are each equipped with one or more man holes that are normally sealed by removable closures 3.

My improved method makes it possible to produce beer of a superior quality, free from a coarse and harsh bitter taste, in a closed fermenter, due to the fact that the major portion of the bitter sediment contained in the foam is separated from the foam and isolated at a point or position where it will not be subsequently acted upon, mixed with or redissolved in the fermenting wort, and my improved fermenter has the desirable characteristics of being easy to clean, of such design that the beer wort capacity of the apparatus is not reduced by the means employed to effect the separation and isolation of the bitter sediment contained in the foam, and it is of such construction that the carbonic acid gases can be collected and the relatively small amount of beer which is carried out of the fermentation chamber into the foam chamber with the escaping gases, can be recovered and returned to the fermenting wort.

Having thus described my invention, what I claim as new and desire to secure by Letters Patent is:

1. A method for making beer, characterized by fermenting beer wort in a closed fermenting chamber, causing the foam to press upwardly against a substantially horizontally-disposed surface located above the level of the liquid wort, and retaining on said surface, after the collapsing of the foam, the bitter sediment previously contained in the major portion of the foam.

2. A method of the kind described in claim 1, which also includes the procedure of causing the carbonic acid gases evolved during fermentation, to escape from the fermenting chamber without dislodging the bitter sediment on the said substantially horizontally-disposed surface in the upper portion of said chamber.

3. A method of the kind described in claim 1, characterized by permitting a portion of the foam to escape from the fermenting chamber, separating the bitter sediment in said escaped foam from the beer entrained in said foam, and returning to the fermenting chamber the beer recovered from the escaped foam.

4. A method for making beer, characterized by fermenting beer wort in a closed fermenting chamber provided with a substantially horizontally disposed ceiling, maintaining the wort in said chamber at such a level that the total amount of foam produced during fermentation will be enough greater than the volume of the space between the liquid wort and the ceiling of the fermenting chamber to insure that the foam will press upwardly against said ceiling, permitting a portion of the foam together with the carbonic acid gases evolved during fermentation to escape from said fermenting chamber, and retaining the major portion of the foam in the fermenting chamber and causing the bitter sediment in said major portion to be left suspended on the underside of said ceiling at a point above the level of the liquid wort when the said foam collapses.

5. A method for making beer, characterized by fermenting beer wort in a fermenting chamber of the closed type, conducting out of the fermenting chamber and collecting for future use the gases evolved during fermentation, and utilizing a substantially horizontally disposed surface that constitutes the ceiling of said chamber to collect and maintain in an isolated condition in said fermenting chamber, out of contact with the liquid wort and out of the path of the escaping gases, the bitter sediment contained in the major portion of the foam produced during fermentation.

6. A method of the kind described in claim 5, characterized by permitting a small portion of the foam produced during fermentation, to escape from said fermenting chamber together with the evolved gases, recovering the beer entrained in said escaped foam, and thereafter returning said recovered beer, substantially free from any bitter sediment, back to the fermenting chamber.

7. A method for making beer, characterized by fermenting beer wort in a closed fermenting chamber, collecting for subsequent use the gases evolved during fermentation, and subjecting the foam to such treatment that the major portion of the foam produced during the entire fermentation period, will be retained in the fermenting chamber and upon collapsing, the bitter sediment in said major portion will be left suspended on the underside of a substantially horizontal surface, disposed so as to effectively prevent said bitter sediment from subsequently mixing with or redissolving in the wort.

8. A method for making beer in a closed fermenter, consisting in keeping the beer wort in the fermenting chamber at such a level that the total volume of foam formed during fermentation will be greater than the volume of the space between the surface of the wort and a substantially horizontally disposed collecting surface at the top of the fermenting chamber, utilizing the gases evolved during fermentation to cause the sediment in the major portion of the foam to be deposited on said collecting surface, whereby said deposited sediment will be retained in the fermenting chamber and prevented from subsequently mixing with or redissolving in the beer when the foam collapses, permitting the gases and the surplus portion of the foam to escape from the fermenting chamber into a foam room, permitting the gases to separate from the escaped foam in the foam room, subjecting the escaped foam to such treatment in the foam room that upon collapsing of the foam, the bitter sediment therein will be separated from the entrained beer, and causing the recovered beer to pass from the foam room back to the fermenting chamber.

RUDOLF GULL.